United States Patent Office 3,470,700
Patented Oct. 7, 1969

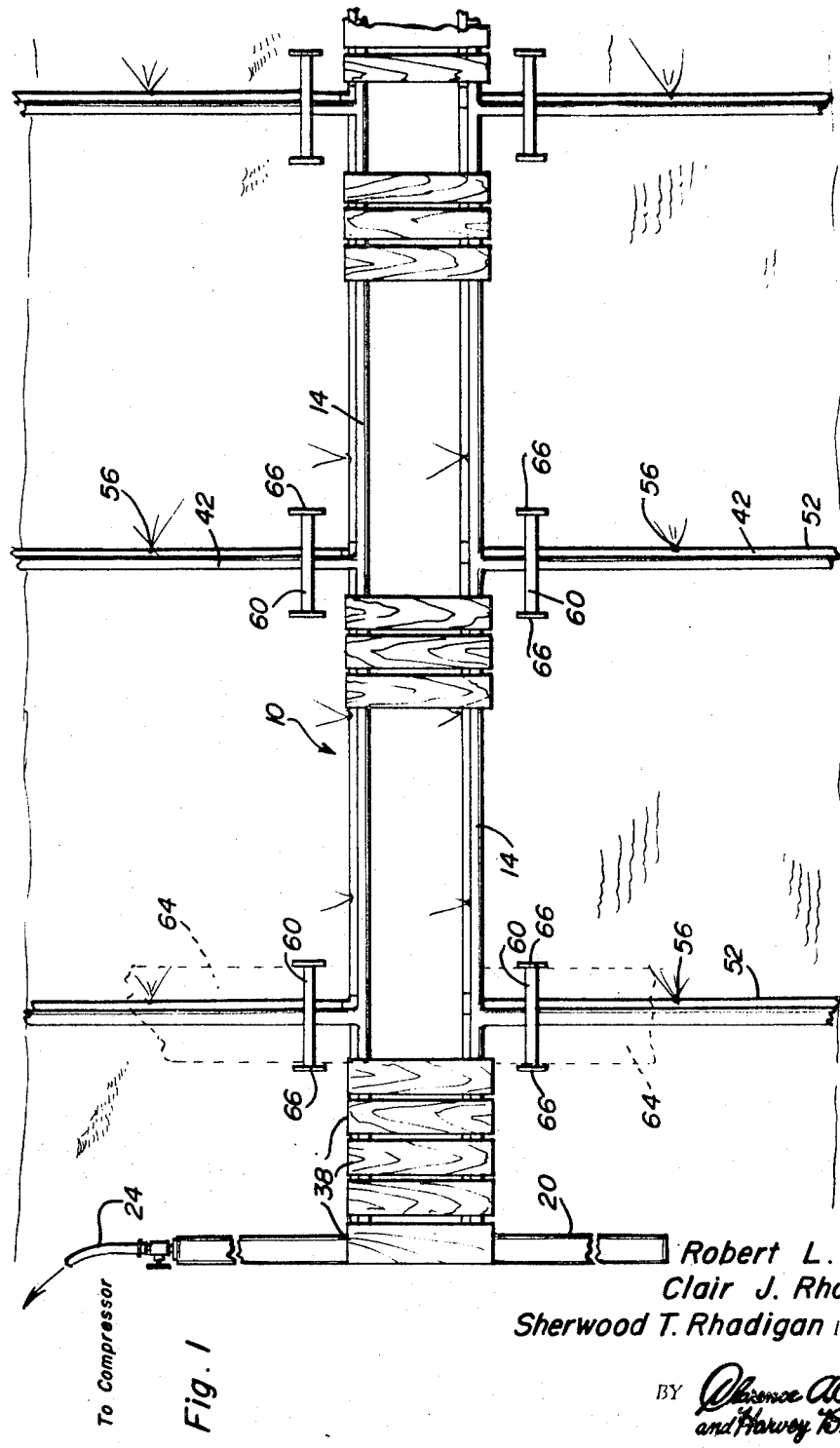

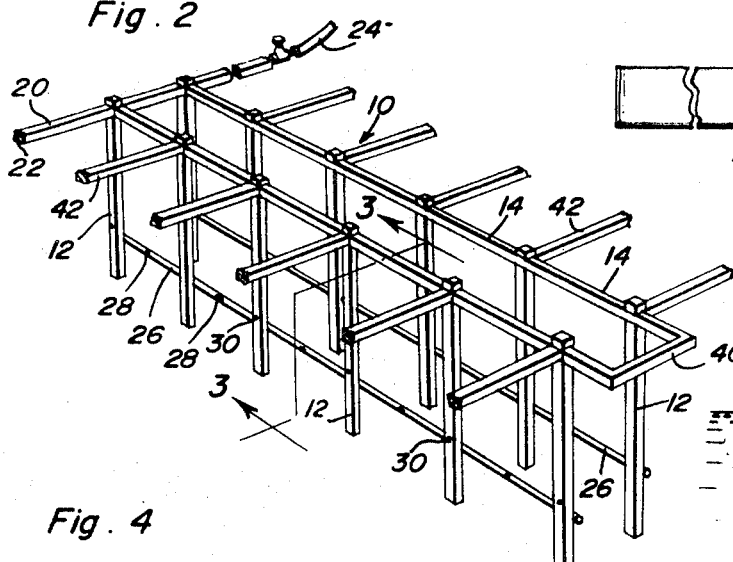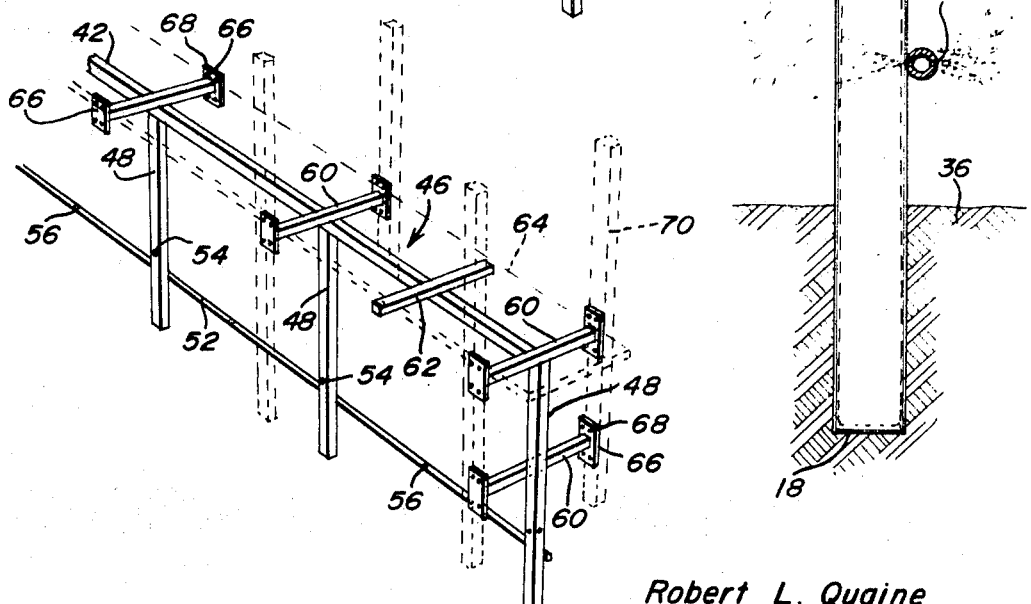

3,470,700
WATER TURBULENCE PRODUCING AIR BUBBLING SYSTEM FOR BOAT DOCKS
Robert L. Quaine, Clair J. Rhadigan, and Sherwood T. Rhadigan, Pearl Beach, Mich., assignors of one-sixth each to Donna Quaine, Dorothy Rhadigan, and Mary Rhadigan, all of Pearl Beach, Mich.
Filed Dec. 6, 1967, Ser. No. 688,530
Int. Cl. E02b 3/20, 15/02, 3/00
U.S. Cl. 61—48                    10 Claims

ABSTRACT OF THE DISCLOSURE

A dock construction including a plurality of uprights spaced along at least one horizontal path and adapted at their lower ends to be supported from the bottom of the docking area on a body of water and means operative to discharge compressed air from locations spaced along the aforementioned path below the upper ends of the uprights.

---

The dock construction of the instant invention has been specifically designed for use in northern climates so as to provide a means whereby unused boats may be left in the water and protected from the water without the boat hulls freezing solid. In addition, the dock construction of the instant invention also insures that solid ice will not form about the uprights from which the dock of the instant invention is constructed and therefore the necessity of "punching" down pilings every spring is eliminated.

The dock construction of the instant invention includes tubular vertical uprights or piles which are closed at their upper and lower ends and are supported at their lower ends from the bottom of a body of water in which boats may be docked. The interiors of the tubular pilings are communicated with each other in any suitable manner by means of interconnecting air conduits opening thereinto and the air conduits are connected to a suitable source of air under pressure. Accordingly, the entire dock structure is communicated with the source of air under pressure and suitable small openings may be formed in the tubular pilings and also in the tubular air conduit defining members extending between the pilings below the surface of the adjacent body of water. In this manner, small quantities of air under pressure may be constantly discharged below the surface and allowed to bubble up through the water. This air bubbling not only provides turbulence which tends to restrict the formation of ice but also creates water currents which convey the warmer water adjacent the bottom upward to the surface and therefore provides a means whereby a supply of warm water currents is provided to further delay freezing.

The conduit means extending between adjacent pilings may also have small outlet openings formed therein and therefore ice may be prevented from forming between adjacent pilings. In addition, the air conduit means is spaced sufficiently below the surface of the adjacent body of water to allow the warmer water to somewhat warm the air passing through the air conduit means. This of course will cause the warmer air to enter the tubular pilings and to at least somewhat warm the inner surfaces of these tubular pilings to further resist the formation of ice adjacent the pilings at the level of the water.

The dock construction may be formed in any conventional dock configuration inasmuch as generally the same components are utilized in constructing a conventional dock, except that the pilings of the instant invention and horizontal stringers connecting adjacent pilings are tubular as opposed to solid.

The main object of this invention is to provide a dock structure including means by which the formation of solid ice around berthed boats and the pilings of the dock structure will be greatly resisted.

Another object of this invention is to provide a dock structure including means for discharging air under pressure in critical areas about the dock structure so as to not only prevent the formation of ice around docked boat hulls but also the uprights of the dock structure.

Still another object of this invention is to provide a dock structure in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary top plan view of a dock construction constructed in accordance with the present invention and with portions of the flooring removed;

FIGURE 2 is a fragmentary perspective view of the grouping of pilings and horizontal stringers which are utilized in the construction of the dock structure of FIGURE 1 and with all of the flooring removed;

FIGURE 3 is an enlarged fragmentary vertical sectional view taken substantially upon the plane indicated by the section line 3—3 of FIGURE 2; and FIGURE 4 is a fragmentary perspective view of one of the branch stringers of the dock construction and which may also comprise an economy version of the dock construction.

Referring now more specifically to the drawings, the numeral 10 generally designates the dock construction. From a comparison of FIGURES 1 and 2 it may be seen that the construction 10 includes a plurality of tubular uprights 12 spaced along two closely adjacent and parallel paths. The tubular uprights 12 in each path are interconnected by means of tubular horizontal members 14 and the upper and lower ends of the uprights 12 are closed by upper and lower walls 16 and 18. The horizontal members 14 open into the upper ends of the uprights 12 and the latter project slightly above the members 14 for a purpose to be hereinafter more fully set forth.

A header conduit 20 extends transversely of the shore end of the dock construction 10 into which one pair of ends of the members 14 open and is closed on one end as at 22 and suitably connected to a source of air under pressure in the form of a compressed air conduit 24 at its other end.

A pair of elongated air conduits 26 are also provided and extend along each of the paths and are supported from and open into each of the uprights 12 disposed in the corresponding path. Further, the conduits 26 are provided with air outlet openings 28 intermediate the uprights 12 and the latter also have air outlet openings 30 formed therein below the surface 32 of the body 34 of water.

The uprights 12 are driven down into the bottom 36 in the conventional manner and therefore the dock structure 10 is maintained in a stationary position and the dock structure may have walkway planks 38 disposed thereover to form a walkway or flooring. The planks 38 have their opposite ends supported from the members 14 and the ends of the members 14 remote from the air conduit 20 are interconnected by means of a similar tubular transverse member 40 functioning to close the ends of the members 14 remote from the header 20. Also, the dock construction 10 may include laterally directed tubular stringers 42 extending outwardly from the upper end of each upright 12 between which boats may be docked and into which the corresponding members 14 open.

With attention now invited to FIGURE 4 of the drawings, it may be seen that the stringers 42 may each include a plurality of closed tubular uprights 48 similar to uprights 14 spaced longitudinally therealong and that an air conduit 52 extends between and is communicated with the lower ends of the uprights 48, the inlet end of each air conduit 52 being communicated with the interior of the corresponding conduit 26. The upper ends of the uprights 48 open into the interior of the corresponding stringers 42 and the uprights include small openings 54 similar to openings 30 and the air conduits 52 include openings 56 similar to openings 28.

The assemblage of FIGURE 4 may be used alone, as an economy version 46 of the dock construction 10 and have the inlet end of the stringer 42 thereof and also the air conduit 52 suitably communicated with a suitable source of air under pressure such as source 24 and header 20. On the other hand, the assemblage of FIGURE 4 may be utilized as a component of the dock construction 10.

The stringers 42 each include a plurality of transverse support members 60 and 62 which may be secured to the uprights 48 as well as the stringers 42 and which may be utilized to support planks 64 from the stringers 42. In addition, the transverse members 60 include opposite end mounting plates 66 suitably apertured as at 68 and which may be utilized to support upstanding boat hull fending members 70 from the members 60.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A marine construction comprising a plurality of closed tubular uprights spaced along a horizontal path and adapted at their lower ends to be supported from the bottom of a body of water, elongated closed tubular connecting members extending between and secured to the uprights of pairs of adjacent uprights, the interiors of said uprights and connecting members being communicated with each other, said marine construction including compressed air discharging means communicated with the interiors of said uprights operative to discharge compressed air from locations spaced along said path and below the upper ends of said uprights and a source of compressed air communicated with the interiors of said uprights.

2. The combination of claim 1 wherein said compressed air discharging means includes compressed air passage means communicated with the interiors of and extending between pairs of adjacent uprights and including air discharge outlet means operative to discharge air from said passage means generally centrally intermediate said uprights.

3. The combination of claim 2 wherein said air discharge outlet means includes outlet openings formed in portions of said air passage means disposed between adjacent uprights.

4. A dock construction comprising a plurality of uprights spaced along a horizontal path and adapted at their lower ends to be supported from the bottom of a docking area on a body of water, elongated connecting members extending between and secured to the uprights of pairs of adjacent uprights, said dock construction including compressed air discharging means operative to discharge compressed air from locations spaced along said path and below the upper ends of said uprights, said means including elongated air conduit means extending along said path and having outlet openings formed therein through which air from a suitable source of air under pressure may be discharged upon communication of said air conduit means with said source, said uprights being hollow and sealed from communication with the ambient atmosphere, said air conduit opening into said uprights, said uprights including small outlet openings.

5. The combination of claim 1 wherein said marine construction comprises a dock structure includes uprights disposed along a pair of generally parallel closely adjacent paths, brace means secured between corresponding uprights disposed along said paths, and a decking structure supported from said grace means and extending between and along said paths.

6. A dock construction comprising a plurality of uprights spaced along a horizontal path and adapted at their lower ends to be supported from the bottom of a docking area on a body of water, elongated connecting members extending between and secured to the uprights of pairs of adjacent uprights, said dock construction including compressed air discharging means operative to discharge compressed air from locations spaced along said path and below the upper ends of said uprights, said dock construction including uprights disposed along a pair of generally parallel closely adjacent paths, brace means secured between adjacent uprights, and a docking structure supported from said brace means and extending between and along said paths, said means including elongated air conduit means extending along said paths and having outlet openings formed therein through which air from a suitable source of air under pressure may be discharged upon communication of said air conduit means with said source, said uprights being hollow and sealed from communication with the ambient atmosphere, said air conduit opening into said uprights, said uprights including small outlet openings.

7. The combination of claim 1 wherein said dock construction includes additional uprights spaced along a path angulated relative to and intersecting with said first path, compressed air passage means extending between said additional uprights and including air discharge outlet means operative to discharge air from the last-mentioned passage means at points spaced along the last-mentioned path.

8. A dock construction comprising a plurality of uprights spaced along a horizontal path and adapted at their lower ends to be supported from the bottom of a docking area on a body of water, elongated connecting members extending between and secured to the uprights of pairs of adjacent uprights, said dock construction including compressed air discharging means operative to discharge compressed air from locations spaced along said path and below the upper ends of said uprights, said dock construction including additional uprights spaced along a path angulated relative to and intersecting with said first path, compressed air passage means extending between said additional uprights and including air discharge outlet means operative to discharge air from the last-mentioned passage means at points spaced along the last-mentioned path, said additional uprights being tubular and are sealed at their opposite ends from direct communication with the ambient atmosphere, said additional uprights being communicated with said compressed air passage means and including air outlet openings in their lower end portions for discharing air under pressure from said additional uprights.

9. The combination of claim 1 wherein at least some of said elongated connecting members include elongated transverse horizontal members upon which flooring boards are adapted to be supported.

10. The combination of claim 9 wherein at least some of said transverse horizontal members include upstanding flange portions at their opposite ends adapted to have upstanding hull fending members secured thereto.

References Cited

UNITED STATES PATENTS

| | | | |
|---|---|---|---|
| 3,046,748 | 7/1962 | Monroe | 61—4 |
| 3,074,238 | 1/1963 | De Golian | 61—4 |

FOREIGN PATENTS 1,211,708  10/1959  France.

JACOB SHAPIRO, Primary Examiner

U.S. Cl. X.R.

61—1, 6